Oct. 24, 1939.  P. W. DEMPSEY  2,177,452
STUD LOCKING DEVICE
Filed Oct. 23, 1937
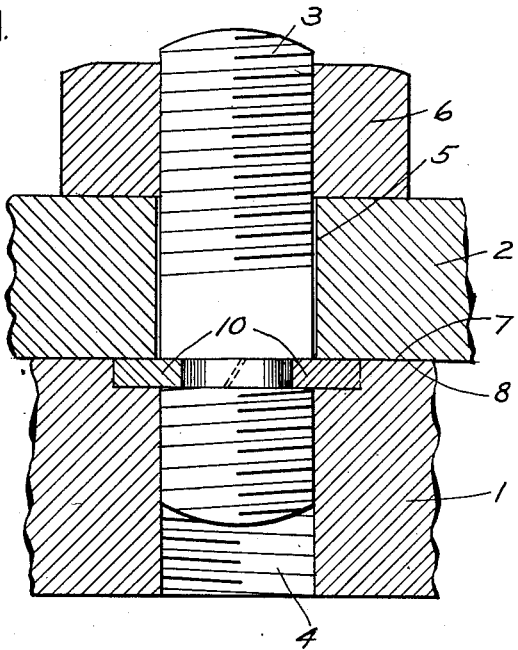
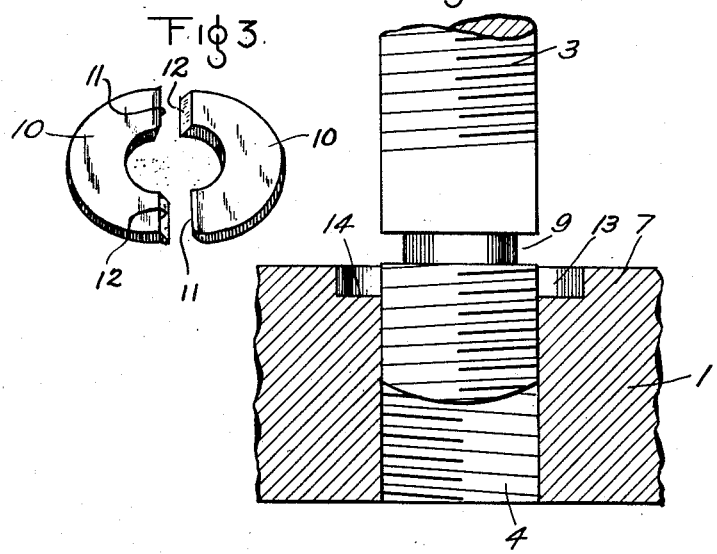
INVENTOR
PHILIP W. DEMPSEY
BY Wm. N. Cady
ATTORNEY Patented Oct. 24, 1939

2,177,452

UNITED STATES PATENT OFFICE 2,177,452

STUD LOCKING DEVICE

Philip W. Dempsey, Pittsburgh, Pa., assignor to The Westinghouse Air Brake Company, Wilmerding, Pa., a corporation of Pennsylvania Application October 23, 1937, Serial No. 170,673

4 Claims. (Cl. 151—32)

This invention relates to locking devices and more particularly to an improved stud and locking means therefore.

Studs are generally employed for securing together two parts of a device, one end of each stud being secured in one part of the device by screw-threaded engagement, while a nut is provided on the other end of each stud outside of the other part of the device for pulling the two parts of the device together.

When the part of a device in which a stud is secured by screw-threaded engagement is made from a relatively soft, low strength metal such as aluminum, it is difficult to obtain a sufficiently tight connection between the stud and device to hold the stud against turning with the nut on the other end when the nut is either tightened up against or loosened from the other part of the device, and unless extreme caution is used in tightening the nut, the threads are stripped in the part of the device in which the stud is secured. Further, in attempting to obtain a tight fit between a stud and a device made of aluminum or the like, the stud is at times screwed into the device until the unthreaded portion, adjacent the threads entering the device, is jammed or wedged into the end of the stud receiving bore, and thus sets up strains in the device which result in cracking thereof.

The principal object of the invention is to provide an improved stud and means associated therewith for obviating the above difficulties.

Other objects and advantages will be apparent from the following more detailed description of the invention.

In the accompanying drawing; Fig. 1 is a sectional view of two parts of a device or the like showing the invention applied thereto; Fig. 2 is a partial assembly view of certain parts of the device shown in Fig. 1; and Fig. 3 is an isometric view of the two parts of a lock washer shown in section in Fig. 1.

The invention is adapted to be employed wherever studs are used for securing together two parts of a device or for securing one device to another or to a bracket, or the like.

In the drawing, the reference characters 1 and 2 indicate two parts of a device or the like which are secured together by a stud 3. The stud 3 has screw-threaded engagement in a threaded bore 4 in the part 1 and freely extends through a smooth bore 5 in the part 2. A nut 6 is provided on the end of the stud 3 outside of the part 2 and is screwed up against the outer face of said part for securing the parts 1 and 2 together with a face 7 on the part 1 engages a face 8 on the part 2.

The stud 3 is preferably of the usual type in which there is provided an annular groove 9 a predetermined distance from the end which is screw-threaded into the part 1, the opposite, parallel side walls of this groove forming shoulders disposed at right angles to the axis of the stud. A lock washer 10 in the form of two like, substantially semi-circular portions of a flat ring having ends 11 crimped or offset axially in one direction and ends 12 offset in the opposite direction are disposed in the groove 9, one portion of the washer at either side of the stud. The outside diameter of the lock washer 10 is greater than the diameter of the stud, and the part 1 of the device is provided with a counterbore 13 which freely receives the portion of the lock washer projecting beyond the periphery of the stud. The depth of the counterbore 13 is substantially equal to the thickness of the lock washer, so that the lock washer, when in place in the part 1, will not extend beyond the face 7 of said part, but instead will be substantially flush therewith.

In applying the stud 3 to the part 1 of the device, it is first screwed part way into said part to a position such as indicated in Fig. 2. The two portions of the lock washer 10 are then inserted into the groove 9, one at either side of the stud, and the stud is then screwed home, the lock washer entering the counterbore 13 and being then clamped between the upper side wall of the groove 9, as viewed in Fig. 2 of the drawing, and the bottom wall 14 of said counterbore.

In screwing the stud home as just described, the stud turns readily until the crimped ends 12 of the lock washer 10 engage the bottom wall 14 of the counterbore. Further turning of the stud is then opposed by the drag of crimped ends 12 against wall 14 and a like drag of the opposite crimped ends 11 against the upper side wall of the annular groove 9, and the degree of this drag increases until said walls bottom against the opposite sides of the lock washer. This gradual increasing drag or resistance to turning and, more particularly, the final bottoming of the stud against the lock washer indicates, by feel, to the workman that the stud is screwed home, so that he will not attempt to turn it further and as a consequence strip or otherwise damage the threads in the part 1 of the device.

In the manner just described, the lock washer 10 acts to limit the depth which the stud is screwed into the part 1 of the device, and it will be noted that when the stud is screwed home, the force applied to the parallel faces of the lock washer through the stud is transmitted to the part 1 of the device parallel to the axis of the stud, thereby avoiding the setting up of stresses in the part 1, other than those unavoidable stresses incident to the coacting forces between the screw-threads on the stud, and those in the part 1, which would tend to crack said part of the device.

It will be further noted that even though the screw-threads in the part 1 of the device may be on the verge of yielding at the time the stud is screwed home, the lock washer 10 acts to hold the threads on the stud in tight engagement with those in part 1 of the device so as to thereby ensure a tight rigid connection between said stud and part.

When the stud is screwed home, the crimped ends 11 of the lock washer are pressed against the upper side wall of groove 9 in the stud, while the crimped ends 12 are pressed against the bottom wall 14 of the counterbore in part 1 of the device, and these crimped ends are so arranged as to gouge into the respective walls of said stud and part and thereby resist backing out of the stud with such force as to prevent the stud turning with nut 6 as said nut is loosened from the part 2 of the device.

Due to variations in manufacture, the lock washer 10 may be flush with or just slightly below the face 7 of part 1 of the device after the stud 3 is screwed home, and also at this time, there may be a slight clearance space between the lower face of said washer and the adjacent side wall of groove 9, as hereinbefore described.

If the lock washer is not flush with face 7 and/or if there is any clearance space between the lower face of said washer and the adjacent side wall of groove 9, then when the nut 6 is screwed down on the stud to secure the parts 1 and 2 of the device together, the force applied to the stud is transmitted to the screw-threads in the part 1 of the device. If this force is sufficient to overcome the strength of the screw-threads in part 1 of the device, said threads will yield and as a consequence permit the stud to move outwardly of the part 1 of the device in the direction of the part 2 until the lower wall of groove 9 engages the lower face of washer 10 and then moves said washer into engagement with face 8 of part 2 of the device which then reacts through the washer as a positive stop to prevent further yielding of the screw-threads in the part 1.

The amount that the screw-threads in part 1 of the device need to yield to obtain the positive engagement between part 2 of the device, lock washer 10 and stud 3, just described, obviously will vary according to the distance which the lock washer is below the face 7 of the part 1 of the device and/or the clearance space between the lower face of said washer and the adjacent side wall of groove 9. The dimensions of these various parts are, however, held to within such limits in manufacture, that the maximum possible yielding of the screw-threads in the part 1 of the device will not be sufficient to effect material weakening thereof.

In case the washer should be just flush with the face 7 and there should be no clearance space to take up between the lower face of washer 10 and the adjacent side wall of groove 9, as will occasionally occur in the process of manufacture, it will be noted that little if any of the force applied to the stud upon tightening nut 6 will be applied to the screw-threads in the part 1 of the device.

By thus limiting the yielding of the screw-threads in part 1 of the device upon tightening of nut 6, material weakening or stripping of said screw-threads is prevented.

By countersinking the lock washer 10 in part 1 of the device it will be noted that said washer does not interfere in any way with securing the two parts of the device together with the faces 7 and 8 in contact with each other.

By the use of the invention, it will be evident that when a device is made from material such as aluminum, difficulties incident to the use of studs therein, such as loose and turning studs, stripping of screw-threads engaged by the stud and cracking or otherwise damaging the device, are avoided.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In combination, an element having a screw-threaded bore and a concentric counterbore, a stud of uniform diameter throughout its length having one end in screw-threaded engagement in said bore and having an annular groove adjacent the portion in said bore, and a two part resilient lock washer encircling said stud and extending into said groove and clamped between the bottom wall of said counterbore and the opposite side wall of said groove, the thickness of said lock washer being substantially equal to the depth of said counterbore.

2. In combination, an element having a screw-threaded bore and a concentric counterbore, a stud having screw-threaded engagement in said bore, another element having a bore through which said stud freely extends, said other element engaging the counterbored face of the first named element, said stud having an annular groove the width of which is substantially equal to the depth of said counterbore and in substantial alignment therewith, and a two part resilient lock washer disposed in said counterbore and extending into said groove, and engaging the bottom wall of said counterbore and the opposite side wall of said groove and adapted to engage the surface of said other element opposite said counterbore and the other side of said groove.

3. In combination, an element having a screw-threaded bore, a stud projecting from said element by having one end screw-threaded in said bore, another element having a bore through which the projecting portion of said stud freely extends, a nut on the other end of said stud for pulling said elements into engagement with each other, said stud having an annular groove adjacent the threaded portion in the first named element, and a two part, resilient lock washer disposed in a counterbore in one of said elements and encircling said stud and extending into said groove, said washer being clamped between the first named element and one side wall of said groove for bottoming the stud in the first named element and adapted to be clamped between the second named element and the opposite side wall of said groove upon tightening said nut on said stud for transmitting force applied by said nut to said stud to the second named element, the thickness of said washer being substantially equal to the width of said groove and the depth of said counterbore.

4. A lock washer for disposition between an annular shoulder on a stud or the like and the bottom of a recess surrounding a threaded bore in a body in which said stud is screwed, said washer securing said stud against undesired backing out of said bore, said lock washer comprising at least two, separate, arcuate portions of a ring adapted to be arranged in substantial abutting relationship around said stud, the abutting ends of said two arcuate portions being offset axially in opposite directions, and the two ends of each arcuate portion being offset axially in opposite directions, the offset ends of each arcuate portion being effective to provide locking engagement with said stud shoulder and bottom wall of said recess.

PHILIP W. DEMPSEY.